(12) United States Patent
Jacobsen

(10) Patent No.: US 8,957,541 B1
(45) Date of Patent: Feb. 17, 2015

(54) SPILLWAY GENERATOR SYSTEM

(76) Inventor: David B. Jacobsen, Inver Grove Heights, MN (US)

( * ) Notice: Subject to any disclaimer, the term of this patent is extended or adjusted under 35 U.S.C. 154(b) by 315 days.

(21) Appl. No.: 13/573,015

(22) Filed: Aug. 14, 2012

(51) Int. Cl.
*F03B 13/00* (2006.01)

(52) U.S. Cl.
USPC .......................................................... 290/54

(58) Field of Classification Search
USPC ...................................................... 290/43, 54
See application file for complete search history.

(56) References Cited

U.S. PATENT DOCUMENTS

| | | | | |
|---|---|---|---|---|
| 313,746 A * | 3/1885 | Man | ................................ | 290/43 |
| 328,447 A * | 10/1885 | Brady | ............................. | 290/43 |
| 447,915 A * | 3/1891 | Stephens | ........................ | 290/43 |
| 867,192 A * | 9/1907 | Dawson | ......................... | 290/43 |
| 904,892 A * | 11/1908 | Pattosien | ....................... | 290/54 |
| 4,352,990 A * | 10/1982 | Aucoin, Jr. | ..................... | 290/54 |
| 4,590,386 A * | 5/1986 | Wiggs | ............................ | 290/54 |
| 4,598,210 A * | 7/1986 | Biscomb | ........................ | 290/43 |
| 4,717,831 A * | 1/1988 | Kikuchi | ......................... | 290/53 |
| 4,725,195 A * | 2/1988 | Wiggs | .............................. | 415/7 |
| 4,737,070 A * | 4/1988 | Horiuchi et al. | .................. | 415/7 |
| 6,551,053 B1 * | 4/2003 | Schuetz | ........................ | 415/3.1 |
| 7,063,579 B2 * | 6/2006 | Voves | ................................ | 440/3 |
| 7,081,690 B2 * | 7/2006 | Coman | ........................... | 290/54 |
| 7,223,137 B1 * | 5/2007 | Sosnowski | ........................ | 440/3 |
| 7,270,513 B2 * | 9/2007 | Regan et al. | ..................... | 416/85 |
| 7,462,949 B2 * | 12/2008 | Coman | ........................... | 290/54 |
| 7,602,076 B1 * | 10/2009 | Sipp | ................................. | 290/54 |
| 7,696,633 B2 * | 4/2010 | Zajchowski et al. | ............ | 290/54 |
| 8,049,355 B2 * | 11/2011 | Bialor | ............................ | 290/53 |
| 8,143,736 B2 * | 3/2012 | Farb | ................................. | 290/53 |
| 8,344,535 B2 * | 1/2013 | Pitre | ............................... | 290/54 |
| 8,466,574 B2 * | 6/2013 | Bear et al. | ........................ | 290/53 |
| 8,772,957 B2 * | 7/2014 | Willingham | .................... | 290/55 |
| 2008/0116692 A1 * | 5/2008 | Lagstrom et al. | ................ | 290/54 |
| 2008/0303284 A1 * | 12/2008 | Clemens | ......................... | 290/54 |
| 2011/0101697 A1 * | 5/2011 | Power et al. | .................... | 290/54 |
| 2013/0241206 A1 * | 9/2013 | Tkadlec | ......................... | 290/54 |

* cited by examiner

*Primary Examiner* — Tho D Ta
(74) *Attorney, Agent, or Firm* — Thomas B. Tate

(57) ABSTRACT

A spillway generator system for generating electrical power from the waste water discharged into the spillway of a waste water treatment plant. The system comprises a plurality of units each including a generator mounted on a deck mounted on pontoons tethered in the spillway and connected to a gear set that is connected by a toothed belt drive to a paddle wheel.

1 Claim, 2 Drawing Sheets

SPILLWAY GENERATOR SYSTEM

BACKGROUND OF THE INVENTION

The field of the invention is systems for generating electrical power from waste water discharged into the spillway of a waste water treatment plant.

Most municipalities operate waste water treatment facilities located on waterways such as rivers, large lakes, or the seashore. These facilities are sited on elevated locations, typically higher than the hundred year flood mark, to prevent backwash from wrecking the facility in the event of a flood. As a result of this design, all treated discharge water flows from the elevated processing facility through a spillway to enter the waterway. Discharge spillways often contain a drop of between eight and fifty feet, or larger in areas with severe tides or flooding risk. The flowing water in the spillway is a potential source, largely untapped at the present time, of clean renewable energy to generate electricity.

SUMMARY OF THE INVENTION

The spillway generator system disclosed herein comprises a plurality of spillway generator units tethered in the spillway so that the spillway generator units float in the center of the spillway section and do not disrupt or impede water flow. Unlike a dam, the spillway generally will not fill with or collect debris because the discharge is newly treated waste water that is debris free. The spillway water does not freeze in winter even in cold northern climates.

The tethering device will also contain a cable to transmit electricity that can provide power for the treatment facility or to be sold on the electrical grid. The spillway generator is designed to handle water flows as slow as two feet per second. As water flows under the floating device, each unit will generate between five and six kilowatts at four hundred eighty volts, three phase, of electricity per hour of operation, typically twenty-four hours per day, three hundred sixty-five days per year.

Electricity generated by the spillway generator can be synchronized to provide larger kilowatt outputs. For example, a facility with ten spillway generator units could turn out fifty kilowatts of onshore electrical power per hour.

An advantage of the invention is that it is a reliable source of clean renewable energy (commonly called green energy) that, in comparison with other sources of green energy, is cheaper and faster to install, has less environmental impact and is unobtrusive aesthetically, and therefore is less likely to arouse community opposition.

Another advantage of the invention is that it can be adapted for use by any size municipality. Typically four to ten spillway generator units would be used per installation, depending on the size of the municipality among other factors. Typically larger metropolitan areas would use numbers toward the high end of that range, small municipalities toward the low end, and midsize municipalities in the middle of the range.

DETAILED DESCRIPTION OF THE INVENTION

The spillway generator system comprises a plurality (usually four to ten) of spillway generator units lined up side by side in the spillway of a waste water treatment plant. In the preferred embodiment of the invention, each of the spillway generator units has the structure hereinafter described.

Figure 2:
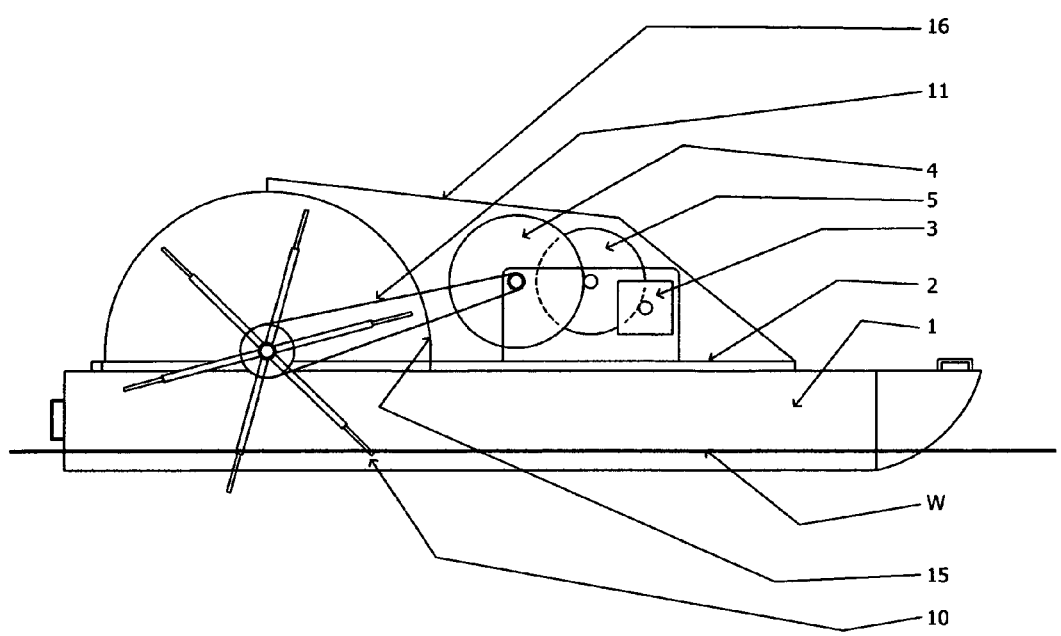
FIG. 2 is a section view taken along line 2-2 of FIG. 1.

A pair of pontoons 1 are positioned in generally parallel spaced relationship floating in an open area of the spillway. The bottoms of the pontoons 1 are slightly below the water line W as shown in FIG. 2. The pontoons 1 are each about fifteen feet long. A deck 2 spans most of the front half of the space between the pontoons 1 and has framing also extending further back along the pontoons 1, and is welded to the top surface of the pontoons 1. The deck 2 has expanded wire mesh in order to allow water that splashes onto the deck 2 to drain through to the waterway.

A generator 3 is mounted on the deck 2. The generator 3 is a four hundred eighty volt, three phase, five kilowatt generator powered by magnets contained within the generator 3. The generator 3 is small (about the size of a loaf of bread) but is heavy because of the magnets. In order to support the weight of the magnets, the deck 2 and pontoons 1 are preferably made of aluminum.

A gear set comprising a primary gear 4, a secondary gear 5, and a tertiary gear 6 is provided. Gears 4, 5, and 6 are concentric and are toothed spur gears. Tertiary gear 6 is mounted on the shaft 7 of the generator 3. The purpose of the gear set is to increase the speed of the current in the waterway (often initially as slow as two feet per second) to three thousand revolutions per minute (RPM). The primary gear 4 spins the secondary gear 5 to increase the RPM. The primary gear 4 and the secondary gear 5 also turn tertiary gear 6 to further increase the RPM.

A four hundred eighty volt, three phase electrical interface 12 is mounted on the deck 2 and is in communication with generator 3 by means of a wire 14 connecting electrical interface 12 with generator 3. The electrical interface 12 serves to interact with the onshore power.

Figure 1:
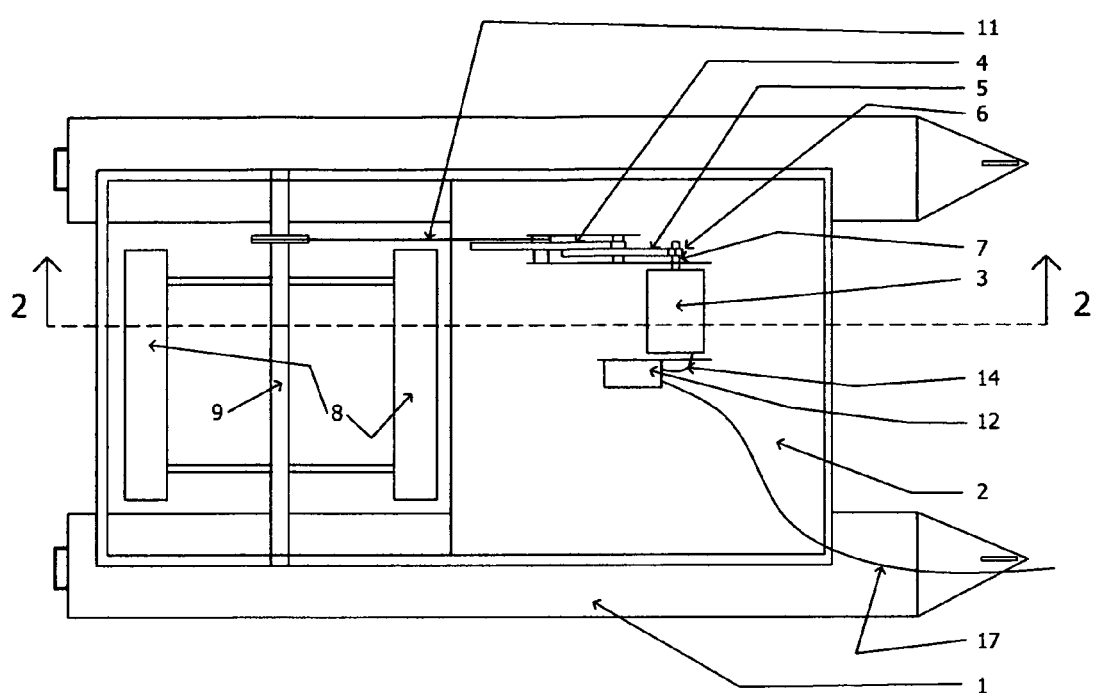
FIG. 1 is a top plan view of a spillway generator unit.

A paddle wheel 8 is positioned in the waterway between the pontoons 1 rearward of the deck 2. The axle 9 of the paddle wheel 8 connects at each end to a pontoon 1. A toothed belt drive 11 connects the axle 9 of the paddle wheel 8 to the primary gear 4. The paddle wheel 8 has six blades 10, each of which is six feet wide by forty-two inches long. The large size of the blades 10 enables the paddle wheel 8 to generate enough torque to turn gears 4, 5, and 6. The current in the waterway pushes the blades 10 of the paddle wheel 8, turning them in a clockwise direction. A paddle wheel shroud 15 prevents water from the paddle wheel 8 from splashing into the generator bay. A second shroud 16 positioned above the components mounted on deck 2 prevents them from getting wet. Shrouds 15 and 16 are shown in FIG. 2. In FIG. 1, the shrouds have been removed in order to reveal the components the shrouds would cover.

A wiring harness 17 is connected to the electrical interface 12. The wiring harness 17 contains a steel cable to tether the spillway generator unit to a structural component of the spillway (not shown). The spillway usually will have a sidewalk several feet above the water, and the steel cable can be connected to the sidewalk by means of an I-bolt, similar to the way a pontoon is connected to a dock. The wiring harness 17 also has in conjunction therewith an electrical cable that extends and connects to a panel box or control box (not shown) located on shore.

The spillway generator system generates electricity from each spillway generator unit by the following process: when the generator 3 is on, the paddle wheel 8 causes the belt drive 11 to turn first the primary gear 4, then the secondary gear 5, then the tertiary gear 6 to generate power that is transmitted through the electrical cable in the wiring harness 17 to the panel box on shore. After that, the power is transmitted the same as any other power would be transmitted through the electrical power grid.

Waste water treatment plants have pumps that pump water from one pool to another within the treatment facility. The electricity generated by the spillway generator system can be used to run these pumps. Any additional power generated beyond that needed to run the facility can be sold to the power grid.

The foregoing description of specific examples of a preferred embodiment was presented by way of illustration of the best mode for carrying out the invention and not by way of limitation, the scope of the invention being limited only by the claims.

I claim:

1. A spillway generator system comprising:

four to ten spillway generator units floating side by side in a spillway of a waste water treatment plant, each of said spillway generator units comprising the following structure:

a pair of pontoons positioned in generally parallel spaced relationship;

a deck mounted on said pontoons, said deck spanning most of a forward area of the space between said pontoons, said deck having framing extending further back along said pontoons, said deck being welded to a top surface of said pontoons, said deck having expanded wire mesh to allow water that splashes onto said deck to drain through to said spillway;

a generator mounted on said deck, said generator being a four hundred eighty volt, three phase, five kilowatt generator powered by magnets contained within said generator;

a gear set comprising a primary gear, a secondary gear, and a tertiary gear, said primary gear meshed with said secondary gear, said secondary gear meshed with tertiary gear, said primary gear is the largest gear of said gears, said tertiary gear is the smallest gear of said gears, said gears being concentric toothed spur gears, said tertiary gear being mounted on a shaft of said generator, said gears increasing the speed of current in said spillway to three thousand revolutions per minute;

a four hundred eighty volt, three phase electrical interface mounted on said deck, said interface being in communication with said generator by means of a wire connecting said electrical interface to said generator;

a paddle wheel positioned between said pontoons rearward of said deck, said paddle wheel being connected by an axle to said pontoons, said paddle wheel having six large blades that are turned in a clockwise direction by the current in said spillway;

a toothed belt drive connecting said axle of said paddle wheel to said primary gear;

a paddle wheel shroud mounted on said deck and positioned above said paddle wheel and a second shroud mounted on said deck above said generator, said gear set, and said electrical interface;

a wiring harness connected to said electrical interface, said wiring harness containing a steel cable to tether said spillway generator unit to a structural component of said spillway and an electrical cable extending to a panel box located on shore;

wherein each of said spillway generator units in said spillway generator system generates electricity from waste water discharged by said plant, said electricity being generated by the following process: when said generator is on, said paddle wheel causes said belt drive to turn said primary gear, then said secondary gear, then said tertiary gear, generating between five and six kilowatts of electrical power per hour that is transmitted through said electrical cable to said panel box, and wherein said spillway generator system synchronizes electricity generated by each of its component spillway generator units to provide larger kilowatt outputs.

* * * * *